(12) United States Patent
Yuki

(10) Patent No.: US 8,792,111 B2
(45) Date of Patent: Jul. 29, 2014

(54) IMAGE PROCESSING APPARATUS, INFORMATION PROCESSING METHOD, AND STORAGE MEDIUM

(75) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/410,048

(22) Filed: Mar. 1, 2012

(65) Prior Publication Data

US 2012/0257240 A1    Oct. 11, 2012

(30) Foreign Application Priority Data

Apr. 5, 2011    (JP) .................................. 2011-083840

(51) Int. Cl.
*G06K 15/00* (2006.01)
*G06F 21/10* (2013.01)
(52) U.S. Cl.
USPC ........ 358/1.14; 358/1.16; 358/1.15; 358/1.13
(58) Field of Classification Search
CPC .............................. G06F 21/10; G06F 21/608
USPC .................................. 358/1.1–1.9, 1.11–1.18
See application file for complete search history.

(56) References Cited

U.S. PATENT DOCUMENTS

| 7,330,862 | B1 * | 2/2008 | Srinivasan et al. ..................... 1/1 |
| 2007/0169119 | A1 * | 7/2007 | Osada ............................ 717/174 |
| 2009/0020600 | A1 * | 1/2009 | Akiba ............................ 235/375 |
| 2009/0133128 | A1 * | 5/2009 | Uchikawa ........................ 726/27 |

FOREIGN PATENT DOCUMENTS

JP    2009-123100 A    6/2009

\* cited by examiner

*Primary Examiner* — King Poon
*Assistant Examiner* — Ibrahim Siddo
(74) *Attorney, Agent, or Firm* — Canon USA, Inc., IP Division

(57) ABSTRACT

A plurality of licenses included in a package license and respectively corresponding to a plurality of applications is stored in a first storage unit, the plurality of applications is stored in a second storage unit, and a product information table associating product information with application information for identifying each of the applications is stored in the second storage unit.

6 Claims, 22 Drawing Sheets

- 502 — LICENSE ID: LIC00001
- 503 — APPLICATION ID: A001
- 504 — VALIDITY PERIOD: 60
- 505 — PRINT UPPER LIMIT: 1000
- 506 — SCAN UPPER LIMIT: 500
- 507 — DEVICE ID: D001

508 — WasolDcQRn6dYjtnltOhVYoUARmcuJk6DhcW0sGZ+Badd7TUrMHbO3g7qxcCQQY
m19Yx/Muj/jkFI4BCjggYfss6mG4ZcSSC384cuHgKIxn8NR/OuDM5i9+D+YFphSydm
vLHwGBqwZ/NiXEVoFgJ1yaKKsTZyJJE1Fi28u49EdI3TWIMn1TArbIJf19YGhMp6IP
tpkpSdOpfzUZZong==

FIG.9

| APPLICATION ID | VALIDITY PERIOD | SCAN UPPER LIMIT | PRINT UPPER LIMIT | LICENSE ID |
|---|---|---|---|---|
| A001 | 60 | 1000 | 500 | LIC00001 |
| A002 | 60 | 500 | 100 | LIC00002 |
| A003 | 60 | 500 | 100 | LIC00003 |
| A004 | 30 | 100 | 100 | LIC00007 |
| A005 | 30 | 100 | 100 | LIC00008 |

FIG.10

| LICENSE ID | TRANSFER |
|---|---|
| LIC00001 | |
| LIC00002 | |
| LIC00003 | |
| LIC00007 | |
| LIC00008 | |
| LIC00009 | YES |
| LIC00010 | YES |

FIG.12

| LICENSE ID 1002 | PRODUCT ID 1003 | PRODUCT NAME 1004 | APPLICATION ID 1005 | APPLICATION NAME 1006 | VALIDITY PERIOD 1007 | SCAN UPPER LIMIT 1008 | PRINT UPPER LIMIT 1009 | DEVICE ID 1010 | DECODING KEY 1011 |
|---|---|---|---|---|---|---|---|---|---|
| LIC00001 | P001 | SECURITY KIT | A001 | SECURITY APPLICATION A | 60 | 1000 | 500 | D001 | k001 |
| LIC00002 | P001 | SECURITY KIT | A002 | SECURITY APPLICATION B | 60 | 500 | 100 | D001 | k002 |
| LIC00003 | P001 | SECURITY KIT | A003 | SECURITY APPLICATION C | 60 | 500 | 100 | D001 | k003 |
| LIC00004 | P001 | SECURITY KIT | A001 | SECURITY APPLICATION A | 120 | 100 | 100 | D002 | k004 |
| LIC00005 | P001 | SECURITY KIT | A002 | SECURITY APPLICATION B | 120 | 100 | 100 | D002 | k005 |
| LIC00006 | P001 | SECURITY KIT | A003 | SECURITY APPLICATION C | 120 | 100 | 100 | D002 | k006 |
| LIC00007 | P002 | SCAN KIT | A004 | SCAN APPLICATION A | 30 | 100 | 100 | D001 | k007 |
| LIC00008 | P002 | SCAN KIT | A005 | SCAN APPLICATION B | 30 | 100 | 100 | D001 | k008 |
| LIC00009 | P003 | PRINT KIT | A006 | PRINT APPLICATION A | 60 | 200 | 200 | D002 | k009 |
| LIC00010 | P003 | PRINT KIT | A006 | PRINT APPLICATION B | 60 | 200 | 200 | D002 | k010 |

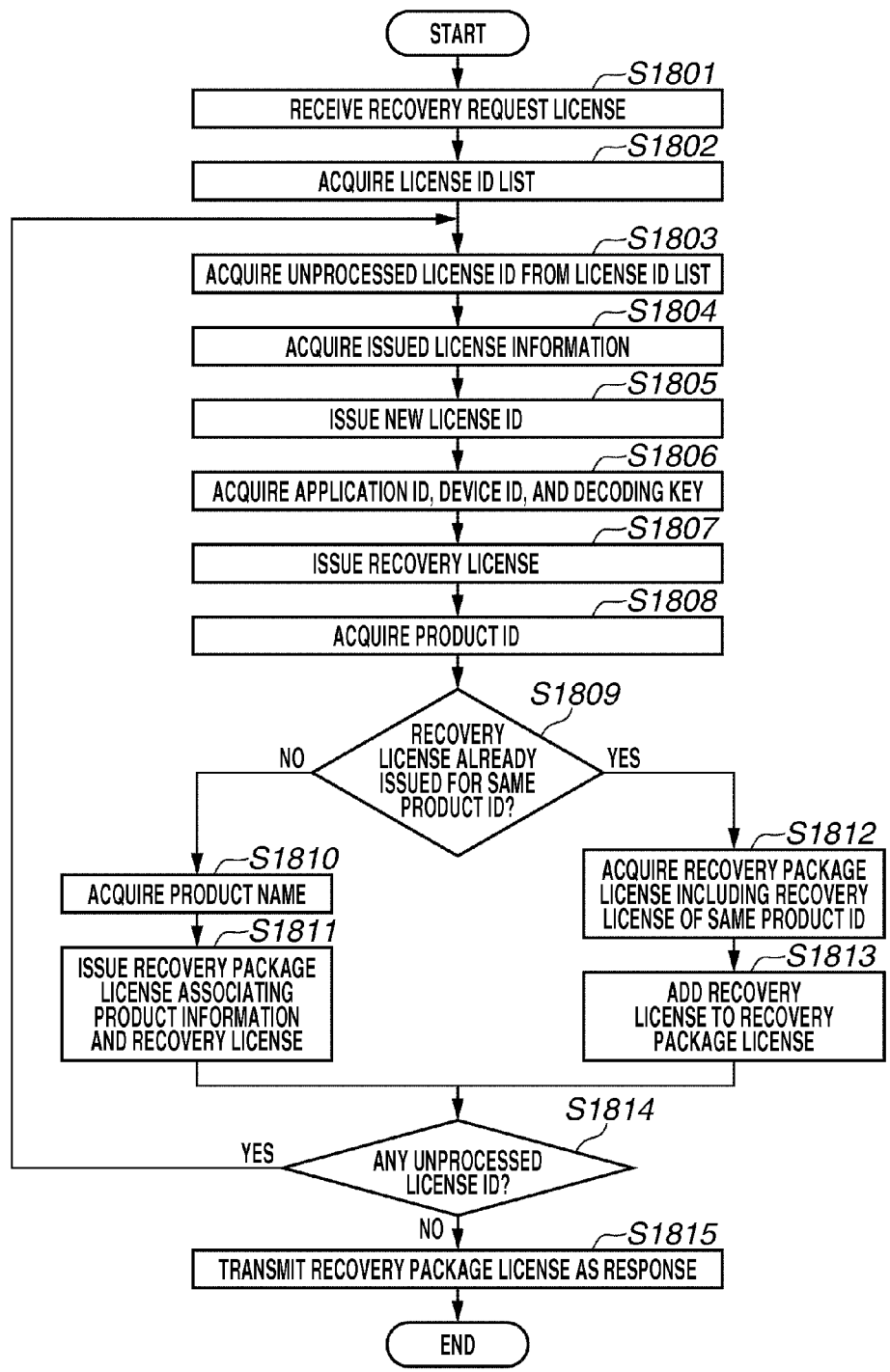

IMAGE PROCESSING APPARATUS, INFORMATION PROCESSING METHOD, AND STORAGE MEDIUM

BACKGROUND OF THE INVENTION

1. Field of the Invention

The present invention relates to an image processing apparatus, an information processing method, and a storage medium.

2. Description of the Related Art

In recent years, in an image forming apparatus such as a multifunction peripheral, an environment for extending its functions by installing a predetermined application has been improved. As a mechanism of preventing unauthorized installation and transfer of such an application, the application is generally managed by a license. Japanese Patent Application Laid-Open No. 2009-123100 discusses license management that prevents, even when a hard disk is damaged, a loss of a license by storing the license in a nonvolatile memory higher in reliability than the hard disk.

SUMMARY OF THE INVENTION

According to an aspect of the present invention, there is provided an image processing system that includes a service platform for managing a job related to image processing in a distributed environment in response to a processing request received via a request reception program and at least one computer for processing the job by a backend processing program. The image processing system includes a reception unit configured to receive a plurality of processing requests related to the image processing under control of the request reception program, a registration unit configured to register the processing request received by the reception unit as a job, an acquisition unit configured to acquire the job registered by the registration unit under control of the backend processing program without waiting for a request from a user or a program, an execution unit configured to execute a task defined in the job acquired by the acquisition unit under the control of the backend processing program, and a recording unit configured to record information regarding a processing result of the task executed by the execution unit, which is used to maintain consistency of the image processing system, in an area which is protected from writing of the task and managed on the service platform.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a license necessary for installing the application in the image forming apparatus.

FIG. 9 illustrates an example of a license management table for managing the licenses installed in the image forming apparatus.

FIG. 10 illustrates an example of a license history table for managing history of the licenses used for installation in the image forming apparatus.

FIG. 12 illustrates an example of a license issuance history table for managing issuance history of the licenses.

FIG. 22 is a flowchart illustrating processing for issuing a recovery license.

DESCRIPTION OF THE EMBODIMENTS

Various exemplary embodiments, features, and aspects of the invention will be described in detail below with reference to the drawings.

In recent years, various pieces of additional information have been requested to be attached to a license. For example, to sell a plurality of applications as one integrated solution product, a mechanism of preventing the applications included in one product from being separately installed in different image forming apparatuses or a mechanism of preventing the applications from being individually transferred is requested. In order to realize such a mechanism, not only information of each application but also product information need to be stored in a nonvolatile memory. However, the nonvolatile memory is higher in price than a hard disk, and hence a capacity of the nonvolatile memory needs to be reduced to lower costs in some cases. In such a case, an issue may arise that the nonvolatile memory may be used to store only important information such as charging information, and other pieces of information such as the information of each application included in one product cannot be stored in the nonvolatile memory.

Figure 1:
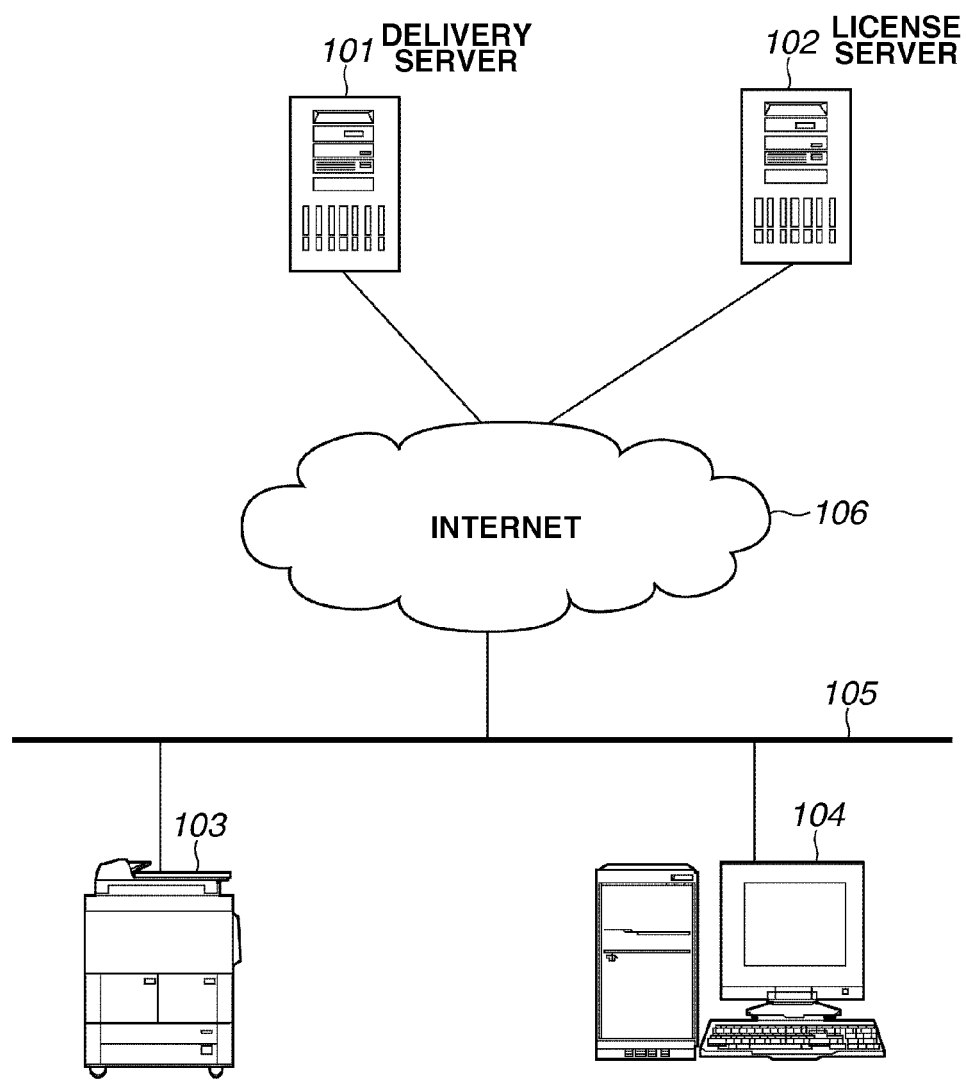
FIG. 1 illustrates an example of a system configuration of a license management system.

FIG. 1 illustrates an example of a system configuration of a license management system according to a first exemplary embodiment of the present invention. An image forming apparatus 103 and an information processing apparatus 104 are connected to communicate with each other via a local area network (LAN) 105. The LAN 105 can be connected to the Internet 106. A license server 102 and a delivery server 101 are connected to the Internet 106. In FIG. 1, the image forming apparatus 103 and the information processing apparatus 104 are connected one each. However, the numbers of respective apparatuses can be arbitrarily set.

Figure 2:
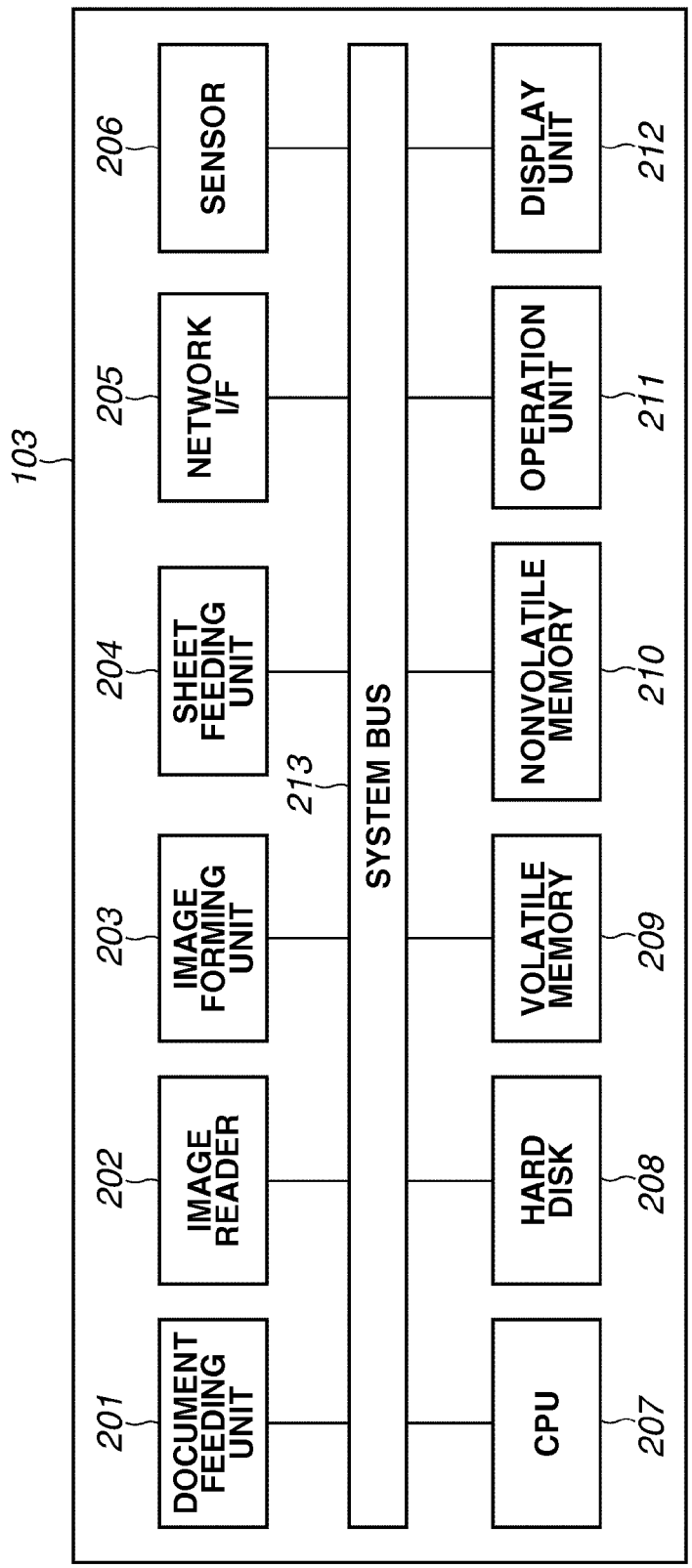
FIG. 2 illustrates an example of a hardware configuration of an image forming apparatus.

FIG. 2 illustrates an example of a hardware configuration of the image forming apparatus 103. The image forming apparatus 103 includes units 201 to 213 described below.

A document feeding unit 201 automatically feeds a document to be read to an image reader 202. The image reader (scanner) 202 reads the document. An image forming unit 203 converts the read document and received data into a print image and prints it. A sheet feeding unit 204 feeds paper for printing. A network interface (I/F) 205 is connected to the LAN and the Internet via a network to exchange information with the outside. A sensor 206 detects a state of each unit in the image forming apparatus 103.

A central processing unit (CPU) 207 executes each processing in the image forming apparatus 103. A hard disk 208 stores a program or data relating to each processing of the image forming apparatus 103. A volatile memory 209 is a rewritable memory that can electrically store temporary data relating to each processing of the image forming apparatus 103. A nonvolatile memory 210 is a rewritable memory that can store data even without any power supply.

An operation unit 211 receives an instruction input to the image forming apparatus 103. A display unit 212 displays information regarding an operation state of the image forming apparatus 103 and an operation performed on the operation unit 211. A system bus 213 connects the units 201 to 212 with each other to exchange data.

The nonvolatile memory 210 is higher in reliability than the hard disk 208, and hence a possibility of a data loss caused by a failure is lower than that of the hard disk 208. The reliability is higher because the nonvolatile memory 210 includes a plurality of memories, and one data is written in each of the plurality of memories. In other words, the nonvolatile memory 210 includes a plurality of memories to acquire backup data.

The exemplary embodiment is described below using the nonvolatile memory 210 as an example of a first storage unit. As an example of a second storage unit which is lower in reliability than the first storage unit, the hard disk 208 is used. However, these examples are in no way limitative of the exemplary embodiment. For example, a mirrored hard disk can be used as the first storage unit, and a non-mirrored hard disk can be used as the second storage unit lower in reliability than the first storage unit.

The CPU 207 executes processing based on a program to achieve a software configuration of the image forming unit 103 and processing in a flowchart executed by the image forming apparatus 103 described below.

Figure 3:
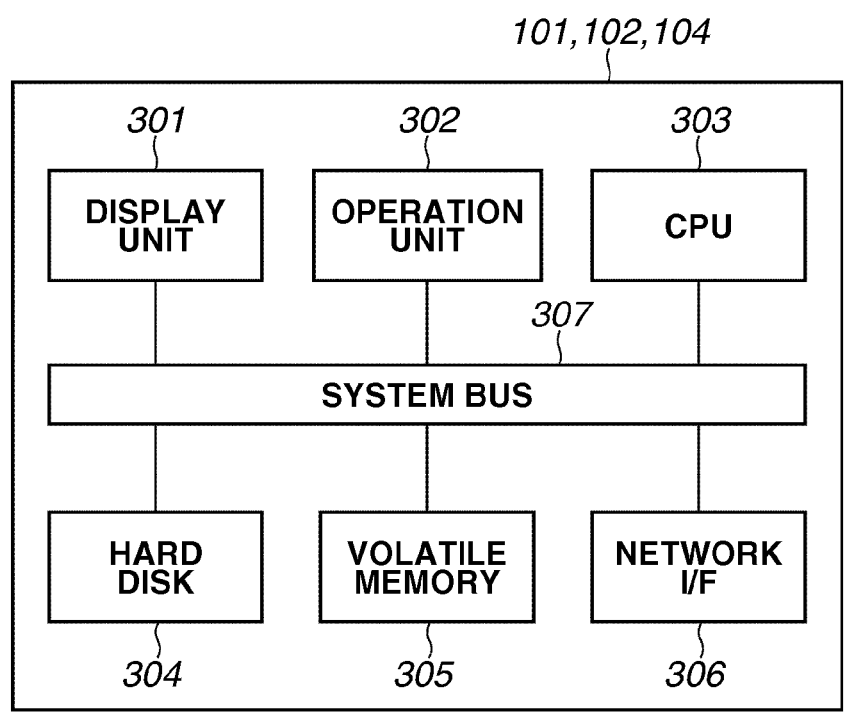
FIG. 3 illustrates an example of a hardware configuration of an information processing apparatus, a delivery server, and a license server.

FIG. 3 illustrates an example of a hardware configuration of the information processing apparatus 104, the delivery server 101, and the license server 102. These apparatuses respectively include units 301 to 307 described below.

A display unit 301 displays a window, an icon, a message, a menu, and other user interface information. An operation unit 302 receives information input by an end user via the display unit 301, a keyboard, or a mouse.

A CPU 303 executes each processing in the apparatus. A hard disk 304 stores a program or data relating to each processing of the apparatus. A volatile memory 305 is a rewritable memory that can electrically store temporary data relating to each processing of the apparatus. A network I/F 306 is connected to the LAN and the Internet via a network to exchange information with the outside. A system bus 307 connects the units 301 to 306 with each other to exchange data.

The CPU 303 of each of the information processing apparatus 104, the deliver server 101, and the license server 102 executes processing based on the program to achieve a software configuration of each of the information processing apparatus 104, the delivery server 101, and the license server 102.

Figure 4:
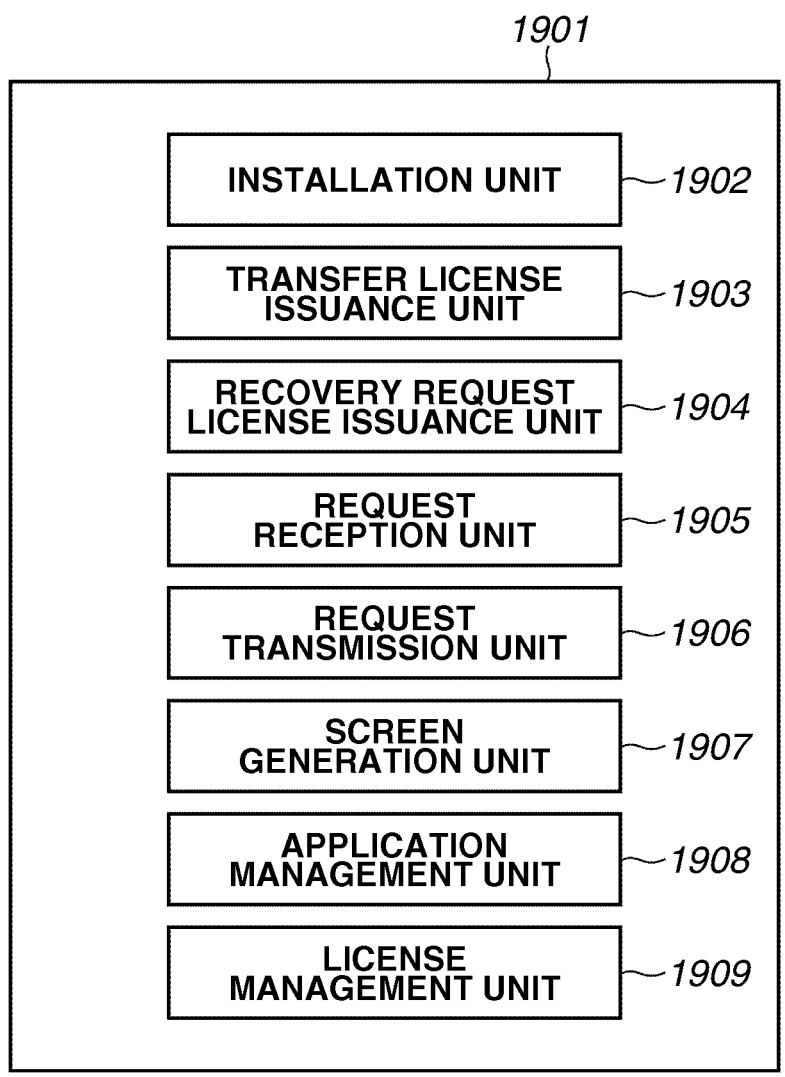
FIG. 4 illustrates an example of a software configuration of the image forming apparatus.

FIG. 4 illustrates an example of a software configuration of the image forming apparatus 103. A license management system 1901 includes units 1902 to 1909 described below. An installation unit 1902 installs an application in the image forming apparatus 103. The application and a license are necessary for the installation at the installation unit 1902. The license is information necessary for validating an application function. Even when the application has been introduced, the application function cannot be used unless the license has been introduced. The installation at the installation unit 1902 is described below referring to FIG. 17.

A transfer license issuance unit 1903 issues a transfer license included in a transfer package license to uninstall the installed application and enable the other image forming apparatus to use the application. The transfer license issued from the transfer license issuance unit 1903 is transmitted together with a transfer request to the license server 102, and can be transferred to the other image forming apparatus. When the license is transferred to the other image forming apparatus, the license sever 102 that has received the transfer license can issue a new license, and the issued new license can be input to the other image forming apparatus. The transfer license issuance processing in the transfer license issuance unit 1903 is described below referring to FIGS. 18 and 19.

A recovery request license issuance unit 1904 issues a recovery request license to recover, after replacement of a damaged hard disk 208 with a new hard disk 208, an application lost due to the failure. The recovery request license issued from the recovery request license issuance unit 1904 is transmitted together with a recovery license issuance request to the license server 102, thus the license server 102 can issue a recovery license. The recovery request license issuance processing in the recovery request license issuance unit 1904 is described below referring to FIGS. 20 and 21.

A request reception unit 1905 receives a request from the network I/F 205. In the present exemplary embodiment, the request received by the request reception unit 1905 is a Hyper Text Transfer Protocol (HTTP) request transmitted from the information processing apparatus 104. However, any type of request can be used.

A request transmission unit 1906 transmits a request from the network I/F 205. In the present exemplary embodiment, the request transmitted by the request transmission unit 1906 is an HTTP request transmitted to the license server 102 and the delivery server 101. However, any type of request can be used.

A screen generation unit 1907 generates a response screen for the request received by the request reception unit 1905. In the present exemplary embodiment, Hyper Text Markup Language (HTML) data of the screen is used as a HTTP response. However, any type of data can be used.

An application management unit 1908 manages the application installed by the installation unit 1902 in the image forming apparatus 103. The application management unit 1908 has functions of controlling activation of the application, checking presence of the application, and managing the application.

A license management unit 1909 manages the license installed by the installation unit 1902 in the image forming apparatus 103. The license management unit 1909 has functions of controlling the application by the license and checking presence of the license.

Figure 5:
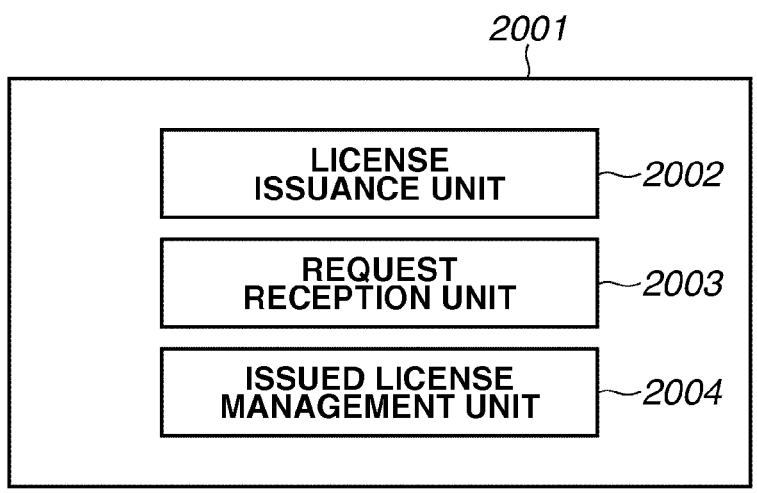
FIG. 5 illustrates an example of a software configuration of the license server.

FIG. 5 illustrates an example of a software configuration of the license server 102. A license issuance system 2001 includes units 2002 to 2004 described below. A license issuance unit 2002 issues a license necessary for installing the application in the image forming apparatus 103.

A request reception unit 2003 receives a request from the network I/F 306. In the present exemplary embodiment, the request received by the request reception unit 2003 is an HTTP request transmitted from the image forming apparatus 103 or the information processing apparatus 104. However, any type of request can be used. An issued license management unit 2004 manages issuance history of the license issued by the license issuance unit 2002.

Figure 6:
FIG. 6 illustrates an example of manifest information included in an application installed in the image forming apparatus.

FIG. 6 illustrates an example of manifest information 401 included in an application to be installed in the image forming apparatus 103. The manifest information 401 is information about an application (application information) to identify the application. The application information contains at least one of application identification (ID) and an application name. Application ID 402 is for uniquely identifying the application, and an application name 403 is a name of the application.

FIG. 7 illustrates an example of a license 501 necessary for installing the application in the image forming apparatus. License ID 502 is for uniquely identifying the license 501. Application ID 503 describes the application ID 402 of the application which can be installed using the license 501. A validity period 504 describes a usable period by the license 501. A print upper limit 505 describes an upper limit of prints usable by the license 501. A scan upper limit 506 describes an upper limit of scanning usable by the license 501. Device ID 507 describes the image forming apparatus 103 in which the application can be installed. Encrypted data 508 is data encrypted in a form that enables decryption of the data pieces 502 to 507 and a key (decoding key) for decrypting the application.

Figure 8:
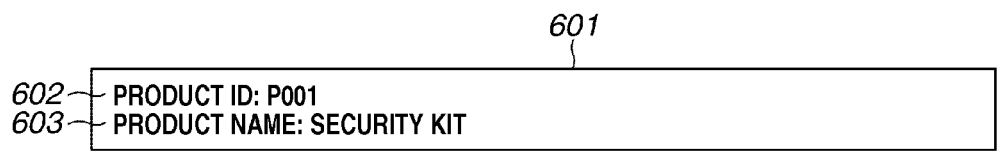
FIG. 8 illustrates an example of manifest information included in a package license which stores a plurality of licenses in one container-type file.

FIG. 8 illustrates an example of manifest information 601 included in a package license which stores a plurality of licenses in one container-type file. Product ID 602 is for uniquely identifying a product. A product name 603 is a name of the product. The manifest information 601 is product information for identifying a composite product packaging a plurality of applications. The product information contains at least one of ID for identifying the composite product and a product name of the composite product.

FIG. 9 illustrates an example of a license management table 701 for managing licenses installed in the image forming apparatus. The license management table 701 is stored in the nonvolatile memory 210 of the image forming apparatus 103. Each license corresponds to each of the plurality of applications in the product package.

An application ID column 702 stores application ID of the application installed in the image forming apparatus 103. A validity period column 703 stores remaining time of the validity period in which the application can be used in the image forming apparatus 103. A scan upper limit column 704 stores the upper limit of scanning times in which the application can be used in the image forming apparatus 103. A print upper limit column 705 stores the upper limit of printing times in which the application can be used in the image forming apparatus 103. A license ID column 706 stores license ID of a license used for installing the application in the image forming apparatus 103.

FIG. 10 illustrates an example of a license history table 801 for managing history of licenses used for installation in the image forming apparatus. The license history table 801 is stored in the nonvolatile memory 210 of the image forming apparatus 103. A license ID column 802 stores license ID of a license used for installation. A transfer column 803 stores a flag indicating whether the license has been transferred and stores data "YES" when it is determined that the license has been transferred.

Figure 11:
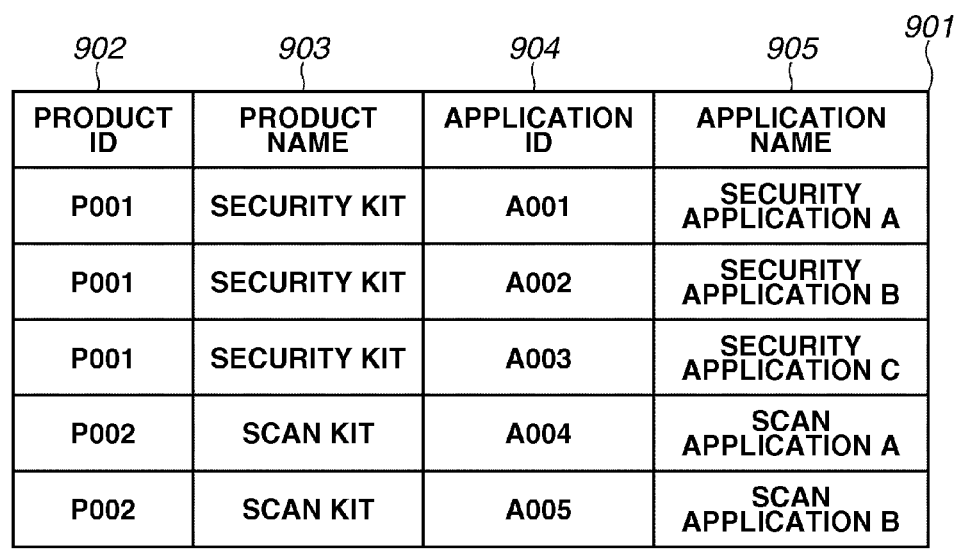
FIG. 11 illustrates an example of a product information table for associating product information with the application.

FIG. 11 illustrates an example of a product information table 901 for associating product information with an application. The product information table 901 is stored in the hard disk 208 of the image forming apparatus 103. A product ID column 902 stores product ID. A product name column 903 stores a name of the product. An application ID column 904 stores application ID of an application associated with the product. An application name column 905 stores an application name of the application associated with the product.

FIG. 12 illustrates an example of a license issuance history table 1001 for managing issuance history of licenses. The license issuance history table 1001 is stored in the hard disk 304 of the license server 102.

A license ID column 1002 stores license ID of licenses issued thus far from the license server 102. A product ID column 1003 stores product ID of a product including an application for which the license is issued. A product name column 1004 stores a product name of the product including the application for which the license is issued. An application ID column 1005 stores application ID of the application for which the license is issued. An application name column 1006 stores an application name of the application for which the license is issued.

A validity period column 1007 stores a validity period of the license. A scan upper limit column 1008 stores a scan upper limit of the license. A print upper limit column 1009 stores a print upper limit of the license. A device ID column 1010 stores device ID of the image forming apparatus in which the license can be installed. A decoding key column 1011 stores a key to decode the application.

Figure 13:
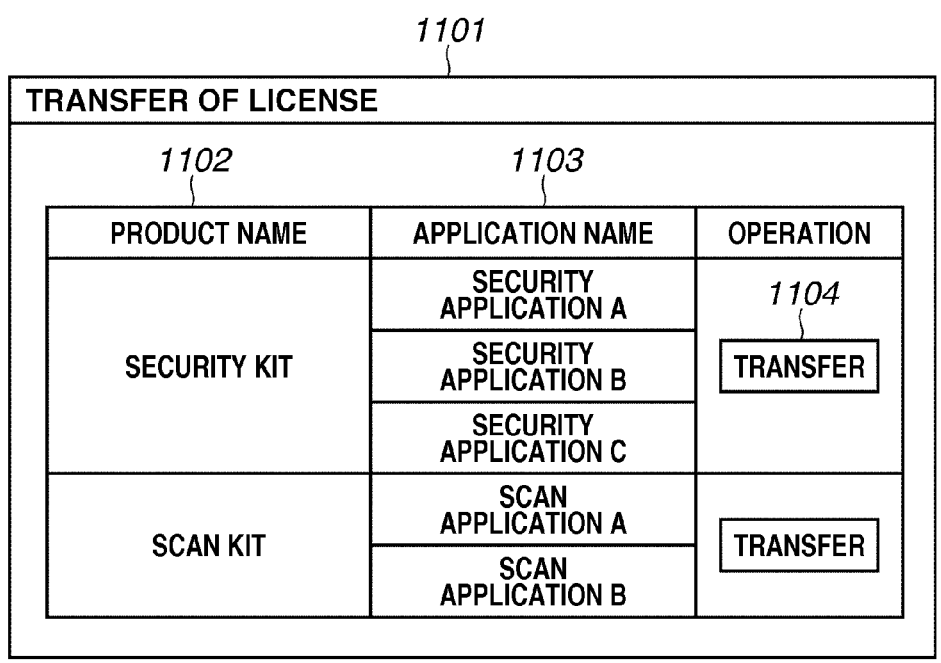
FIG. 13 illustrates an example of a transfer screen on which transfer of the application can be instructed.

FIG. 13 illustrates an example of a transfer screen 1101 on which application transfer can be instructed. The transfer screen 1101 is generated by the image forming apparatus 103 when a transfer request is received from the information processing apparatus 104, and transmitted as a response to the image processing apparatus 104. The information processing apparatus 104 displays the transfer screen 1101 received as the response on the display unit 301. Displaying on the transfer screen 1101 is described in detail below referring to FIG. 18.

A product name of a product installed in the image forming apparatus 103 is displayed in a product name column 1102. An application name of an application installed in the image forming apparatus 103 is displayed in an application name column 1103. Application names displayed on the application name column 1103 are collectively displayed by product units because they are transferred by the product units. A transfer button 1104 is used for instructing transfer of the product installed in the image forming apparatus 103. One transfer button 1104 is displayed for each product unit to execute transfer by product units.

Figure 14:
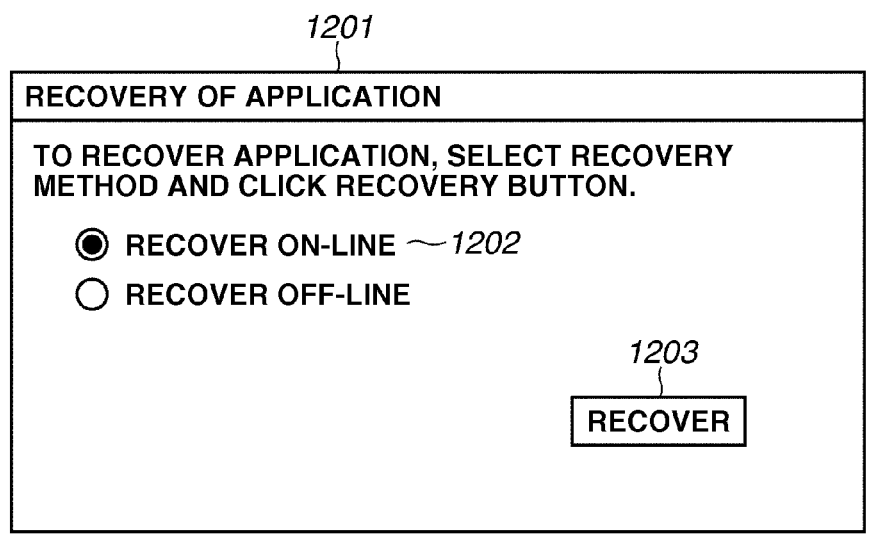
FIG. 14 illustrates an example of a recovery screen for recovering the application.

FIG. 14 illustrates an example of a recovery screen 1201 for recovering an application. The recovery screen 1201 is generated by the image forming apparatus 103 to be returned as a response when an application information request is received from the information processing apparatus 104. The information processing apparatus 104 displays the recovery screen 1201 received as the response on the display unit 301. The displaying of the recovery screen 1201 is described in detail below referring to FIG. 20.

A recovery method radio button 1202 is for selecting an application recovery method. An operator can select on-line or off-line by the recovery method radio button 1202. A recovery button 1203 is used for instructing application recovery.

Figure 15:
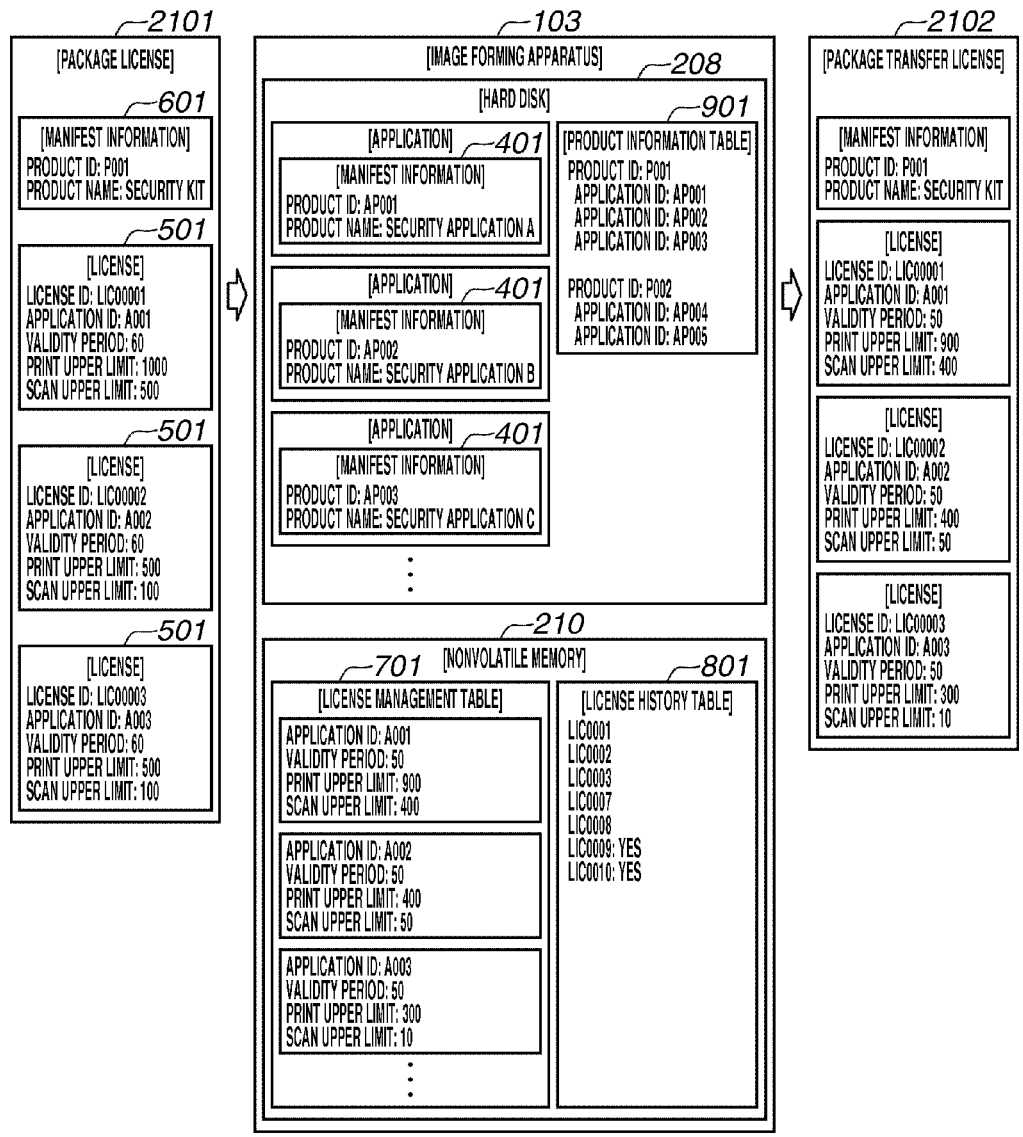
FIG. 15 illustrates license installation and transfer processing.

FIG. 15 illustrates installation and transfer of a license. In FIG. 15, for simplicity, for example, some pieces of information stored in the table or the license are omitted.

The installation unit 1902 of the image forming apparatus 103 stores, to execute installation, an application and the product information table 901 in the hard disk 208. The product informant table 901 stores pieces of information 602 and 603 acquired from manifest information 601. The installation unit 1902 stores the license management table 701 and the license history table 801 in the nonvolatile memory 210.

The license management table 701 stores data 503 to 506 included in the license 501. The license history table 801 stores the license ID 502 of the manifest information 601. This installation is described in detail below referring to FIG. 17.

The screen generation unit 1907 of the image forming apparatus 103 combines, based on a transfer request, the pieces of product information of the product information table 901 with the licenses of the license management table 701 to generate the transfer screen 1101 for transferring the licenses by product units. The generation of the transfer screen is described in detail below referring to FIG. 18.

The transfer license issuance unit 1903 of the image forming apparatus 103 acquires, after reception of a transfer license generation request, the applications (application ID and application names) associated with the designated products from the product information table 901 to generate an application list. The transfer license issuance unit 1903 acquires the licenses of the applications included in the generated application list from the license management table 701 to acquire a license list. The transfer license issuance unit 1903 then issues a package transfer license 2102 storing the licenses included in the license list. The issuance of the package transfer license 2102 is described in detail below referring to FIG. 19.

Thus, the image forming apparatus 103 can transfer the licenses by product units by combining the licenses in the nonvolatile memory 210 with the pieces of product information in the hard disk 208.

Figure 16:
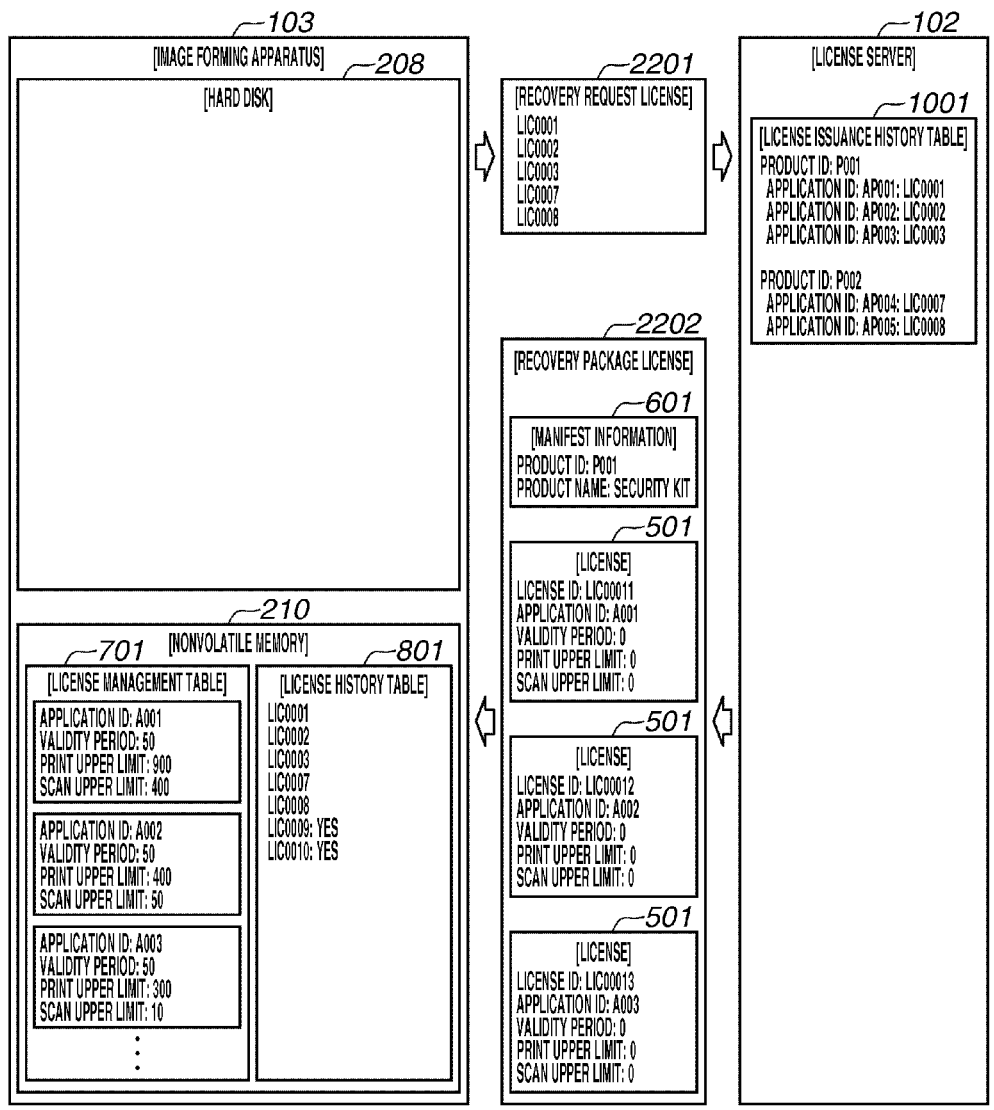
FIG. 16 illustrates application recovery.

FIG. 16 illustrates application recovery. In FIG. 16, for simplicity, for example, some pieces of information stored in the table or the license are omitted.

FIG. 16 illustrates a state of the image forming apparatus 103 in which the hard disk 208 that has damaged is replaced with a new hard disk 208, and an application and a product information table 902 stored at the time of installing an application are not present. When the product information table 901 is not present in the hard disk 208 while a license is present in the nonvolatile memory, the image forming apparatus 103 executes the following processing. The image forming apparatus 103 issues a recovery request license 2201 for storing a list of license ID which has not been transferred yet in the license history table 801 in the nonvolatile memory 210. The issuance of the recovery request license 2201 is described in detail below referring to FIG. 21.

Upon receiving the recovery request license 2201, the license server 102 identifies a list of records of the license issuance history table 1001 including the same license ID from the license ID list included in the recovery request license 2201. The license server 102 acquires product ID and product names which are pieces of product information of the identified record to generate the manifest information 601.

The license server 102 generates the license 501 including application ID, application name, device ID, decoding key, newly issued license ID, validity period, scan upper limit, and print upper limit acquired from the identified record. At that time, the license server 102 generates the license 501 with the validity period, the scan upper limit, and the print upper limit set to zero (0). This is to prevent addition of these values during reinstallation since the license management table 701 in the nonvolatile memory 201 remains even when the hard disk 208 of the image forming apparatus 103 is damaged. Thus, the license sever 102 generates and issues a license recovery license to prevent any changes in valid values of the license including the upper limit and the validity period.

The license server 102 generates a recovery package license 2202 from the generated manifest information 601 and the list of licenses 501 to transmit it to the image forming apparatus 103.

Figure 17:
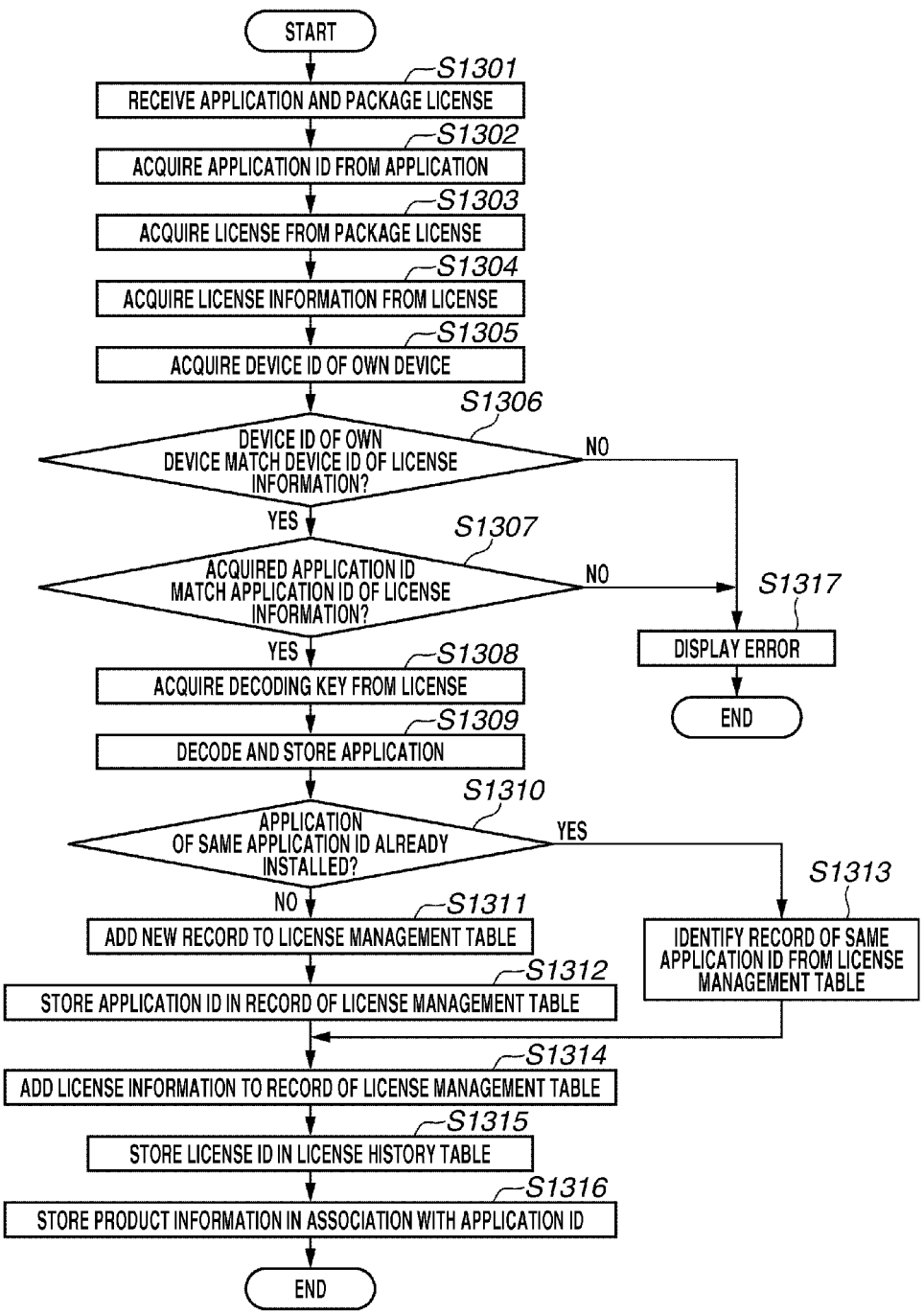
FIG. 17 is a flowchart illustrating processing for installing an application and a license.

Processing of the present exemplary embodiment is described referring to a flowchart of FIG. 17. FIG. 17 is a flowchart illustrating processing when an application and a license are installed. The processing of the flowchart is executed when the request reception unit 1905 of the image forming apparatus 103 receives an installation instruction request from the information processing apparatus 104 with use of the application and the package license 2101 as arguments.

In step S1301, the installation unit 1902 acquires the application and the package license 2101 from the request. In step S1302, the installation unit 1902 acquires the application ID 402 from the manifest information 401 of the application.

In step S1303, the installation unit 1902 acquires the license 501 including application ID identical to the application ID 402 acquired in step S1302 from the package license 2101. In step S1304, the installation unit 1902 acquires the encrypted data 508 from the license 501 acquired in step S1303, and the decoded data pieces 502 to 507 of the license 501. Hereinafter, the decoded data pieces 502 to 507 are referred to as license information.

In step S1305, the installation unit 1902 acquires the device ID stored in the nonvolatile memory 210.

In step S1306, the installation unit 1902 compares the device ID 507 stored in the license information acquired in step S1304 with the device ID acquired in step S1305. If the device IDs match with each other as a result of comparison (YES in step S1306), the installation unit 1902 advances the processing to step S1307. Whereas if not, (NO in step S1306) the installation unit 1902 advances the processing to step S1317.

In step S1307, the installation unit 1902 compares the application ID 503 stored in the license information acquired in step S1304 with the application ID acquired instep S1302. If the application IDs match with each other as a result of comparison (YES in step S1307), the installation unit 1902 advances the processing to step S1308. Whereas if not, (NO in step S1307) the installation unit 1902 advances the processing to step S1317.

In step S1308, the installation unit 1902 acquires the decoding key of the application from the license 501. In step S1309, the installation unit 902 decodes the application acquired in step S1301 using the application decoding key acquired in step S1308 and stores the decoded application in the hard disk 208.

In step S1310, the installation unit 1902 checks whether the application ID 402 acquired in step S1302 is present in the license management table 701 in the nonvolatile memory 210. If the application ID identical to the application ID 402 acquired in step S1302 is not present in the license management table 701 (NO in step S1310), the installation unit 1902 advances the processing to step S1311. Whereas if present (YES in step S1310), the installation unit 1902 advances the processing to step S1313.

In step S1311, the installation unit 1902 adds a new record to the license management table 701 in the nonvolatile memory 210.

In step S1312, the installation unit 1902 stores the application ID 402 acquired in step S1302 in the record added in step S1311.

In step S1313, the installation unit 1902 identifies a record having application ID identical to the application ID 402 acquired in step S1302 from the license management table 701 in the nonvolatile memory 210.

In step S1314, the installation unit 1902 adds the validity period, the print upper limit, and the scan upper limit included in the license 501 to the record in the license management table 701. Through the processing in step S1314, the license corresponding to the application stored in step S1309 is stored in the nonvolatile memory 210.

In step S1315, the installation unit 1902 acquires the license ID 502 from the license 501, and adds a new record to the license history table 801 in the nonvolatile memory 210. The installation unit 1902 then stores the acquired license ID 502 in the license ID column 802.

In step S1316, the installation unit 1902 adds a record to the product information table 901 in the hard disk 208. The installation unit 1902 stores the product ID 602 and the product name 603 of the manifest information 601 of the package license 2101 in the added record. Further, the installation unit 1902 stores the application ID 402 and the application name 403 of the manifest information of the application in the added record. Through the processing in step S1306, the manifest information 601 (product information) of the package license 2101 and the manifest information 401 (application information) of the application are associated with each other.

Figure 18:
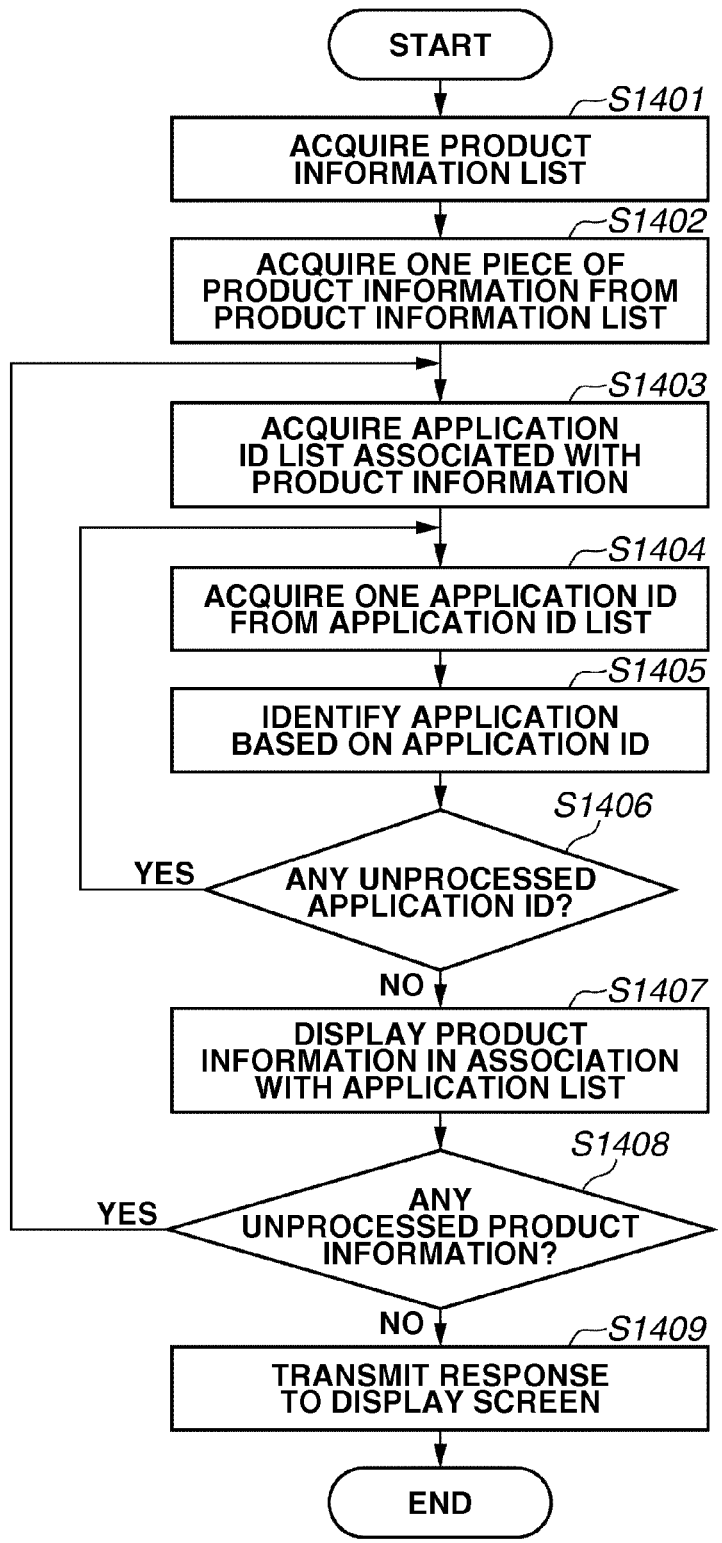
FIG. 18 is a flowchart illustrating processing for displaying a license transfer screen.

FIG. 18 is a flowchart illustrating processing when a license transfer screen is displayed. The processing of the flowchart is executed when the request reception unit 1905 of the image forming apparatus 103 receives a transfer instruction from the information processing apparatus 104.

In step S1401, the screen generation unit 1907 acquires a product information list from the product information table 901 stored in the hard disk 208. In step S1402, the screen generation unit 1907 acquires one piece of unprocessed product information from the product information list acquired in step S1401.

In step S1403, the screen generation unit 1907 acquires the application ID list associated with the product ID 602 of the product information from the product information table 901. In step S1404, the screen generation unit 1907 acquires unprocessed application ID from the application ID list acquired in step S1403.

In step S1405, the screen generation unit 1907 identifies the application from the application ID acquired in step S1404.

In step S1406, the screen generation unit 1907 checks whether any unprocessed application is present in the application list. If unprocessed application is present in the application list (YES in step S1406), the processing returns to step S1404, and if not (NO in step S1406), the processing proceeds to step S1407.

In step S1407, the screen generation unit 1907 generates data to display the product name of the product information acquired in step S1402 in the product name column 1102 of the transfer screen 1101. The screen generation unit 1907 generates data to display the application name of the application acquired in step S1405 in the application name column 1103.

In step S1408, the screen generation unit 1907 checks whether any unprocessed product is present in the product list. If unprocessed product is present in the product list (YES in step S1408), the processing returns to step S1403, and if not (NO in step S1408), the processing proceeds to step S1409.

In step S1409, the screen generation unit 1907 transmits the transfer screen 1101 as a response to the information processing apparatus 104 that has issued the transfer instruction.

Figure 19:
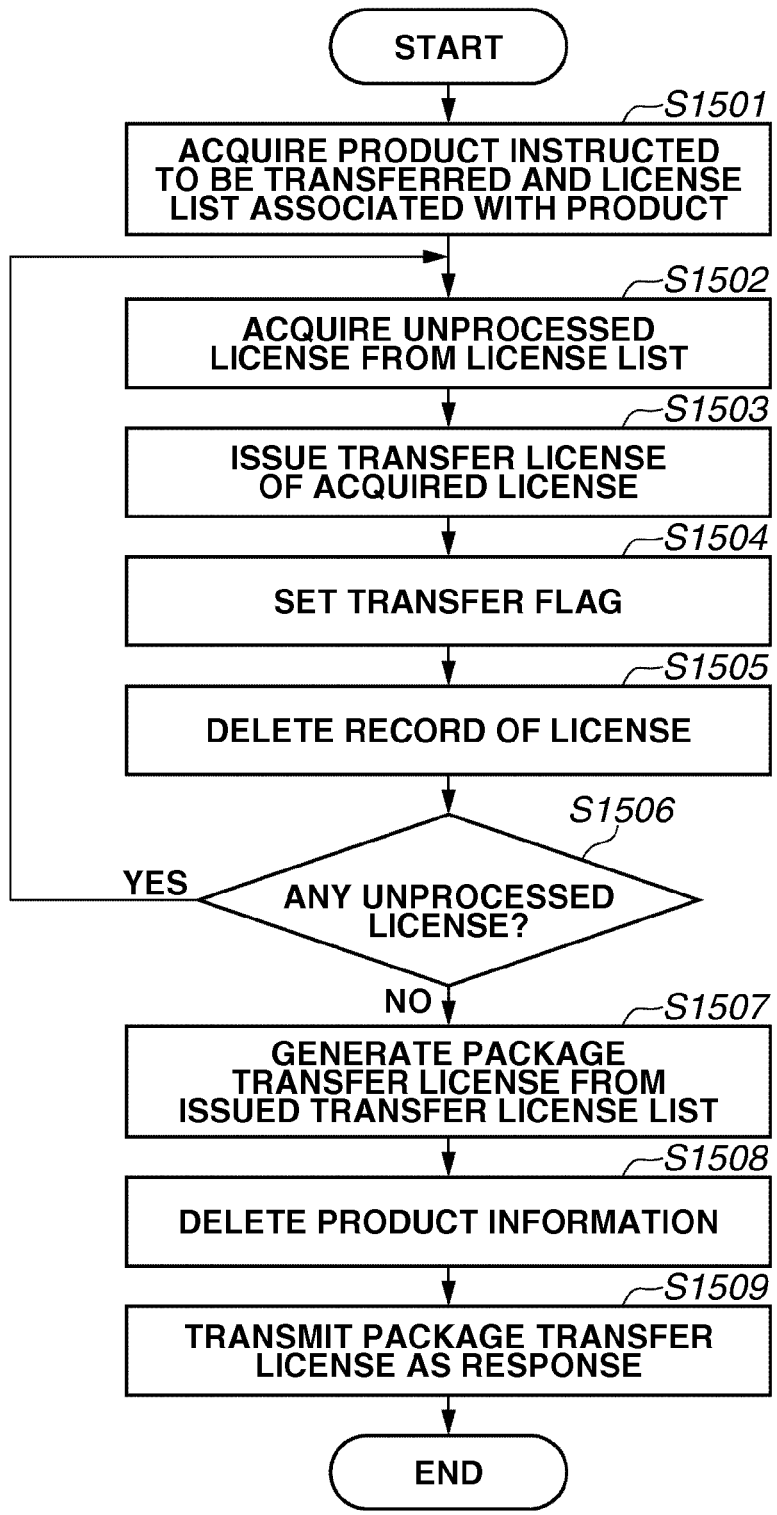
FIG. 19 is a flowchart illustrating processing for issuing a transfer license.

FIG. 19 is a flowchart illustrating processing when a transfer license is issued. The processing of the flowchart is executed when the transfer button 1104 is pressed on the transfer screen 1101.

In step S1501, the transfer license issuance unit 1903 acquires the license list by acquiring, based on the application ID list of the product names associated with the transfer button 1104, the record including the application ID identical to the application ID included in the list from the license management table 701.

In step S1502, the transfer license issuance unit 1903 acquires the record of the unprocessed license from the license list acquired in step S1501. In step S1503, the transfer license issuance unit 1903 issues the transfer license of the license acquired in step S1502.

In step S1504, the transfer license issuance unit 1903 acquires the license ID from the license ID column 706 of the record acquired in step S1502, and acquires a record having matched license ID from the license history table 801. The transfer license issuance unit 1903 sets the transfer flag by setting a value of "YES" in the transfer column 803 of the acquired record. In step S1505, the transfer license issuance unit 1903 deletes the record of the license acquired in step S1502 from the license management table 701.

In step S1506, the transfer license issuance unit 1903 determines whether any record of an unprocessed license is present in the license list acquired in step S1501. If the record of the unprocessed license is present in the license list (YES in step S1506), the processing returns to step S1502. If not (NO in step S1506), the processing proceeds to step S1507.

In step S1507, the transfer license issuance unit 1903 generates the package transfer license from the transfer license list generated in step S1503. In step S1508, the transfer license issuance unit 1903 deletes the record of the product information associated with the transfer button 1104 pressed on the transfer screen 1101 from the product information table 901.

In step S1509, the transfer license issuance unit 1903 transmits the package transfer license generated in step S1507 as a response to the information processing apparatus 104.

According to the above-described processing, the transfer can be performed not by each application unit but a product unit. Thus, when there is an application to be transferred, the user can collectively transfer applications even without understanding the other applications included in a product that need to be simultaneously transferred. Conventionally, transfer must be executed by a number of times equal to the number of applications included in the product. However, according to the present exemplary embodiment, transfer can be executed by a product unit, and time necessary for transfer can be shortened.

Figure 20:
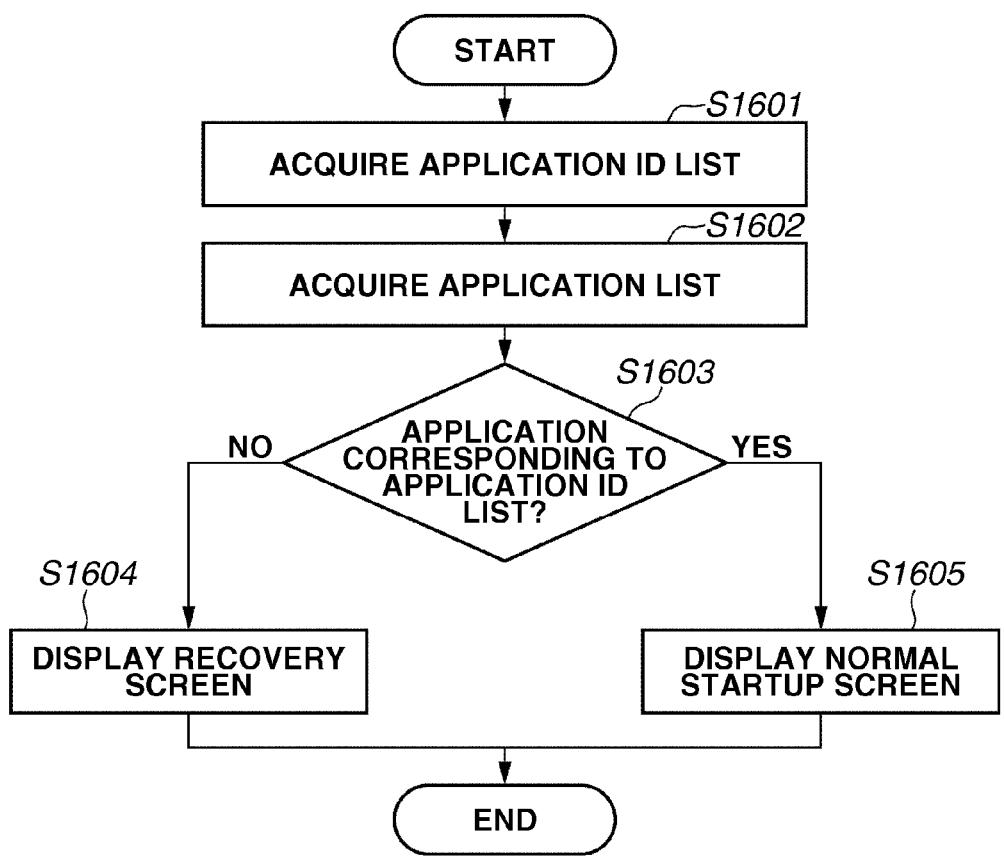
FIG. 20 is a flowchart illustrating processing for checking presence of an application.

FIG. 20 is a flowchart illustrating processing for checking presence of an application. The processing in the flowchart is executed when the request reception unit 1905 of the image forming apparatus 103 receives a request of application information from the information processing apparatus 104.

In step S1601, the screen generation unit 1907 acquires the application ID from the application ID column 702 of the license management table 701 to acquire an application ID list that is a list of the application ID.

In step S1602, the screen generation unit 1907 acquires the application list that is a list of the applications from the hard disk 208.

In step S1603, the screen generation unit 1907 checks whether all the application IDs included in the application ID list acquired instep S1601 are present in the application list acquired instep S1602. If all the application IDs are present (YES in step S1603), the screen generation unit 1907 advances the processing to step S1605. Whereas if not (NO in step S1603), the screen generation unit 1907 advances the processing to step S1604.

In step S1604, the screen generation unit 1907 transmits information to display the recovery screen 1201 as a response to the information processing apparatus 104.

In step s1605, the screen generation unit 1907 transmits information to display a normal startup screen as a response to the information processing apparatus 104.

The example of the processing executed when the information processing apparatus 104 requests the application information to the image forming apparatus 103 is described above. However, the processing in the flowchart in FIG. 20 can be executed when the image forming apparatus 103 is activated. In this case, the screen generation unit 1907 displays the recovery screen 1201 of step S1604 and the normal startup screen of step S1605.

Figure 21:
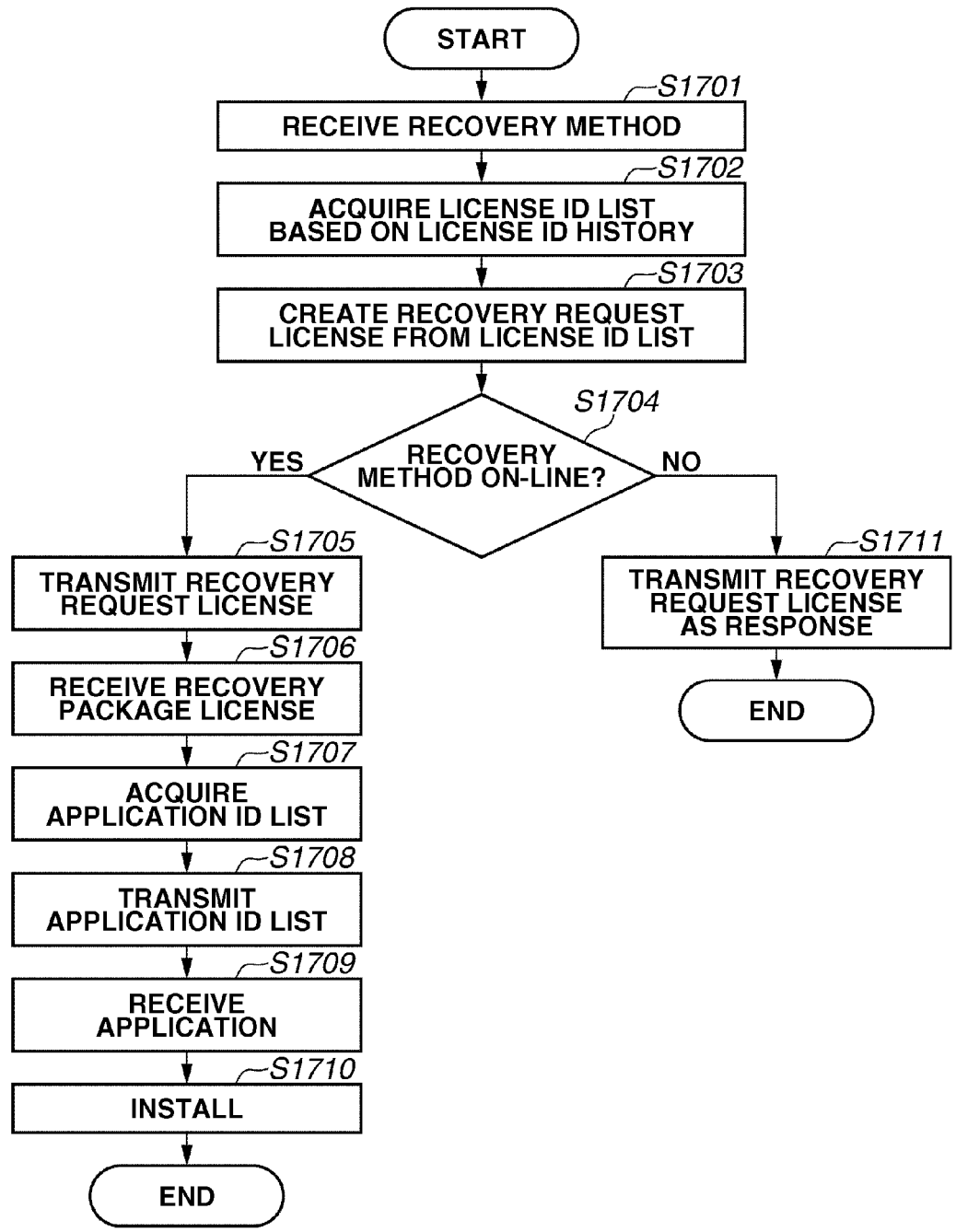
FIG. 21 is a flowchart illustrating processing for issuing a recovery request license.

FIG. 21 is a flowchart illustrating processing when a recovery request license is issued. The processing in the flowchart is executed when the recovery button 1203 of the recovery screen 1201 is pressed.

In step S1701, the recovery request license issuance unit 1904 acquires information regarding which of on-line and off-line selection of the recovery method radio button 1202 is.

In step S1702, the recovery request license issuance unit 1904 acquires a license ID list by acquiring the license ID of the record in which YES is not set in the transfer column 803 of the license history table 801 from the license ID column 802. In step S1703, the recovery request license issuance unit 1904 generates the recovery request license 2201 including the license ID list acquired in step S1702.

In step S1704, the recovery request license issuance unit 1904 determines whether the recovery method acquired in step S1701 is on-line. If on-line is selected (YES in step S1704), the processing proceeds to step S1705. If off-line is selected (NO in step S1704), the processing proceeds to step S1711.

In step S1705, the recovery request license issuance unit 1904 transmits the recovery request license 2201 generated in step S1703 to the license server 102 via the request transmission unit 1906.

In step S1706, the installation unit 1902 receives the recovery package license 2202 from the license server 102 via the request reception unit 1905 as a response to the request in step S1705.

In step S1707, the installation unit 1902 acquires a record of the license ID matched with the license ID included in the license ID list acquired in step S1702. The installation unit 1902 acquires the application ID list by acquiring the application ID from the record.

In step S1708, the installation unit 1902 transmits the application ID list acquired in step S1707 to the delivery server 101 via the request transmission unit 1906. In step S1709, the installation unit 1902 receives the list of the applications from the delivery server 101 via the request reception unit 1905 as a response to the request in step S1708.

In step S1710, the installation unit 1902 executes installation using the recovery package license received in step S1706 and the application list received in step S1709. The installation executed in this case is illustrated in FIG. 17.

In step S1711, the recovery request license issuance unit 1904 transmits the recovery request license generated in step S1703 as a response to the image processing apparatus 104.

FIG. 22 is a flowchart illustrating processing when a recovery license is issued. The processing in the flowchart is executed when the license sever 102 receives the recovery request license from the image forming apparatus 103 in step S1705.

In step S1801, the request reception unit 2003 receives the recovery request license 2201 from the image forming apparatus 103. In step S1802, the license issuance unit 2002 acquires the license ID list from the recovery request license 2201.

In step S1803, the license issuance unit 2002 acquires unprocessed license ID from the license ID list acquired in step S1802. In step 1804, the license issuance unit 2002 acquires the record including the license ID acquired in step S1803 in the license ID column 1002 of the license issuance history table 1001.

In step S1805, the license issuance unit 2002 issues the license ID not used in the license issuance history table 1001. In step S1806, the license issuance unit 2002 acquires the application ID, the device ID, and the decoding key from the application ID column 1005, the device ID column 1010, and the decoding key column 1011 of the record acquired in step S1804.

In step S1807, the license issuance unit 2002 issues the recovery license including the license ID issued in step S1805 and the application ID, the device ID, and the decoding key acquired in step S1806. The license issuance unit 2002 includes the validity period, the scan upper limit, and the print upper limit having values of zero (0) in the recovery license.

In step S1808, the license issuance unit 2002 acquires the product ID from the product ID column 1003 of the record acquired in step S1804.

In step S1809, the license issuance unit 2002 checks whether the recovery license of the record having the product ID identical to the product ID acquired in step S1808 has been issued. If the recovery license has not been issued (NO in step S1809), the license issuance unit 2002 advances the processing to step S1810. If the recovery license has been issued (YES in step S1809), the license issuance unit 2002 advances the processing to step S1812.

In step S1810, the license issuance unit 2002 acquires the product name from the product name column 1004 of the record acquired in step S1804. In step S1811, the license issuance unit 2002 issues the recovery package license 2202 storing the recovery license issued in step S1807 and the manifest information 601 including the product ID acquired in step S1808 and the product name acquired in step S1810.

In step S1812, the license issuance unit 2002 acquires the recovery package license 2202 including the recovery license including the product ID identical to the product ID acquired in step S1808. In step S1813, the license issuance unit 2002 adds the recovery license issued in step S1807 to the recovery package license 2202 acquired in step S1812.

In step S1814, the license issuance unit 2202 checks whether unprocessed license ID is present in the license ID list. If unprocessed license ID is present (YES in step S1814), the processing returns to step S1803, and if not (NO in step S1814), the processing proceeds to step S1815.

In step S1815, the license issuance unit 2002 transmits the issued recovery package license 2202 as a response to the image forming apparatus 103.

The present exemplary embodiment can provide the license management function that uses much more information by storing the license in the highly reliable nonvolatile memory and storing the product information in the hard disk lower in reliability. Further, if the hard disk lower in reliability is damaged, the present exemplary embodiment can provide the highly reliable license management by recovering the product information based on the license stored in the nonvolatile memory.

Thus, according to the above-described exemplary embodiment, a low-cost and highly reliable license management technique can be provided, which combines a first storage unit and a second storage unit lower in reliability than the first storage unit. The image forming apparatus 103 is one example of such an image processing apparatus.

Aspects of the present invention can also be realized by a computer of a system or apparatus (or devices such as a CPU or an MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-083840 filed Apr. 5, 2011, which is hereby incorporated by reference herein in its entirety.

What is claimed is:

1. An image processing apparatus comprising:
a first storage unit;
a second storage unit lower in reliability than the first storage unit because of a higher possibility of a data loss caused by a failure;
a reception unit configured to receive a package license which includes product information of a product containing a plurality of applications and a plurality of licenses respectively corresponding to the plurality of applications and included therein;
an installation unit configured to store the plurality of licenses included in the package license received by the reception unit and respectively corresponding to the plurality of applications in the first storage unit, store the plurality of applications in the second storage unit, and store a product information table associating the product information with application information for identifying each of the applications in the second storage unit; and
a display unit configured to display a license transfer screen including a name of the product, names of the plurality of applications included in the product, and a button capable of designating transfer of a license by a unit of the product,
wherein, transfer of a license by a unit of each application included in the plurality of applications is unable to be designated on the license transfer screen.

2. The image processing apparatus according to claim 1,
wherein the product information contains the name of the product,
wherein the application information contains a name of the application, and
wherein the image processing apparatus further comprises a screen generation unit configured to generate the license transfer screen capable of instructing, in response to a transfer request from an information processing apparatus communicable via a network, transfer of the package license by a unit of the product information containing the name of the product and the name of the application included in the product based on the product information and the application information associated with the product information, and transmit the license transfer screen to the information processing apparatus.

3. The image processing apparatus according to claim 2,
wherein the installation unit storing license information for identifying the license stored in the first storage unit,
wherein the image processing apparatus further comprises a transfer license issuance unit configured to issue, when an instruction to transfer the package license via the transfer screen is received from the information processing apparatus, a transfer package license by the unit of the product information, and
wherein the transfer license issuance unit sets a flag indicating completion of transfer to license information of a license to be transferred by the transfer package license among pieces of the license information stored in the first storage unit.

4. The image processing apparatus according to claim 3, further comprising a recovery request license issuance unit configured to generate, when recovery of data stored in the second storage unit is instructed, a recovery request license including license information for which the flag is not set among pieces of the license information of the plurality of licenses stored in the first storage unit, and transmit the recovery request license to a license server apparatus communicable via the network, which has issued the package license.

5. A method for information processing executed by an image processing apparatus including a first storage unit and a second storage unit lower in reliability than the first storage unit because of a higher possibility of a data loss caused by a failure, the method comprising:
receiving a package license which includes product information of a product containing a plurality of applications and a plurality of licenses respectively corresponding to the plurality of applications and included therein;
storing the plurality of licenses included in the received package license and respectively corresponding to the plurality of applications in the first storage unit, storing the plurality of applications in the second storage unit, and storing a product information table associating the product information with application information for identifying each of the applications in the second storage unit; and
displaying a license transfer screen including a name of the product, names of the plurality of applications included in the product, and a button capable of designating transfer of a license by a unit of the product, wherein, transfer of a license by a unit of each application included in the plurality of applications is unable to be designated on the license transfer screen.

6. A non-transitory computer-readable storage medium storing a program in a computer including a first storage unit and a second storage unit lower in reliability than the first storage unit because of a higher possibility of a data loss caused by a failure, the program causing an image processing apparatus to execute a method comprising:

receiving a package license which includes product information of a product containing a plurality of applications and a plurality of licenses respectively corresponding to the plurality of applications and included therein;

storing the plurality of licenses included in the received package license and respectively corresponding to the plurality of applications in the first storage unit, storing the plurality of applications in the second storage unit, and storing a product information table associating the product information with application information for identifying each of the applications in the second storage unit; and displaying a license transfer screen including a name of the product, names of the plurality of applications included in the product, and a button capable of designating transfer of a license by a unit of the product, wherein, transfer of a license by a unit of each application included in the plurality of applications is unable to be designated on the license transfer screen.

\* \* \* \* \*